US010904093B2

(12) United States Patent
Hu et al.

(10) Patent No.: US 10,904,093 B2
(45) Date of Patent: Jan. 26, 2021

(54) CLUSTER SYSTEM SELF-ORGANIZING METHOD, DEVICE, AND CLUSTER SYSTEM

(71) Applicant: Huawei Technologies Co., Ltd., Shenzhen (CN)

(72) Inventors: Lin Hu, Shenzhen (CN); Xiangping Wu, Shenzhen (CN); Peixing Peng, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 478 days.

(21) Appl. No.: 15/392,136

(22) Filed: Dec. 28, 2016

(65) Prior Publication Data

US 2017/0195185 A1 Jul. 6, 2017

(30) Foreign Application Priority Data

Dec. 31, 2015 (CN) .......................... 2015 1 1028856

(51) Int. Cl.
*H04L 12/24* (2006.01)
*H04W 84/18* (2009.01)
*H04W 24/02* (2009.01)

(52) U.S. Cl.
CPC .......... *H04L 41/12* (2013.01); *H04L 41/0803* (2013.01); *H04W 84/18* (2013.01); *H04W 24/02* (2013.01)

(58) Field of Classification Search
CPC .... H04L 41/0803; H04L 41/12; H04W 24/02; H04W 84/18

(Continued)

(56) References Cited

U.S. PATENT DOCUMENTS 8,966,046 B2 2/2015 Preden et al.
2004/0053620 A1* 3/2004 Garrison ............... H04W 16/02
455/448

(Continued)

FOREIGN PATENT DOCUMENTS

CN 101800689 A 8/2010
CN 103441918 A 12/2013

(Continued)

OTHER PUBLICATIONS

Foreign Communication From A Counterpart Application, Chinese Application No. 201511028856.0, Chinese Notice of Allowance dated Nov. 5, 2019, 4 pages.

(Continued)

*Primary Examiner* — Huy D Vu
*Assistant Examiner* — Nizam U Ahmed
(74) *Attorney, Agent, or Firm* — Conley Rose, P.C.

(57) ABSTRACT

A cluster system self-organizing method including receiving, by a node A in a cluster system, a request message sent by an external node for requesting to join the cluster system, where the node A is one node in the cluster system, the node A and at least one other node in the cluster system mutually have a bidirectional neighbor relationship, and two nodes that have the bidirectional neighbor relationship mutually transmit information, separately determining, by the node A, whether a ratio of a space area that is of the node A and that is allocated in the cluster system to a space area that is of each bidirectional neighbor node of the node A and that is allocated in the cluster system meets a preset relationship, and establishing, by the node A, the bidirectional neighbor relationship with the external node when the preset relationship is met.

20 Claims, 10 Drawing Sheets an effect obtained when any node requests to join a cluster system

(58) Field of Classification Search
USPC .......................................................... 370/255
See application file for complete search history.

(56) References Cited

U.S. PATENT DOCUMENTS

| | | | |
|---|---|---|---|
| 2006/0031429 A1 | 2/2006 | Ayyagari | |
| 2013/0138792 A1* | 5/2013 | Preden | H04L 41/02 709/223 |
| 2014/0022951 A1* | 1/2014 | Lemieux | H04L 45/22 370/255 |
| 2014/0162682 A1* | 6/2014 | Tafreshi | H04W 24/02 455/456.1 |
| 2015/0098388 A1 | 4/2015 | Fang et al. | |
| 2015/0223143 A1 | 8/2015 | Celebi et al. | |
| 2015/0382228 A1* | 12/2015 | Otomo | H04W 84/18 370/230 |

FOREIGN PATENT DOCUMENTS

| | | |
|---|---|---|
| CN | 104378800 A | 2/2015 |
| CN | 105027173 A | 11/2015 |
| EP | 2874434 A1 | 5/2015 |
| JP | 2006050636 A | 2/2006 |

OTHER PUBLICATIONS

Machine Translation and Abstract of Chinese Publication No. CN101800689, Aug. 11, 2010, 23 pages.

Machine Translation and Abstract of Chinese Publication No. CN103441918, Dec. 11, 2013, 12 pages.

Foreign Communication From A Counterpart Application, Chinese Application No. 201511028856.0, Chinese Office Action dated May 7, 2019, 6 pages.

Foreign Communication From A Counterpart Application, European Application No. 16206544.5, Extended European Search Report dated May 26, 2017, 10 pages.

Foreign Communication From A Counterpart Application, European Application No. 16206544.5, European Office Action dated Feb. 15, 2019, 10 pages.

Foreign Communication From A Counterpart Application, Japanese Application No. 2016-256211, Japanese Office Action dated Jan. 16, 2018, 2 pages.

Foreign Communication From A Counterpart Application, Japanese Application No. 2016-256211, English Translation of Japanese Office Action dated Jan. 16, 2018, 2 pages.

* cited by examiner a state of organizing a cluster structure another state of organizing a cluster structure an effect obtained when any node requests to join a cluster system after a node B joins a cluster system FIG. 7 an effect obtained when all nodes join a cluster system a cluster system a cluster system according to an embodiment of the present disclosure

CLUSTER SYSTEM SELF-ORGANIZING METHOD, DEVICE, AND CLUSTER SYSTEM

CROSS-REFERENCE TO RELATED APPLICATIONS

This application claims priority to Chinese Patent Application No. 201511028856.0, filed on Dec. 31, 2015, which is hereby incorporated by reference in its entirety.

TECHNICAL FIELD

Embodiments of the present disclosure relate to cluster system self-organizing technologies, and in particular, to a cluster system self-organizing method, a device, and a cluster system.

BACKGROUND

A cluster is a group of mutually independent terminal devices, such as computers and mobile communications devices, that are interconnected using a high-speed network. All terminal devices in a cluster system may be referred to as nodes. The nodes form a group and are managed as a single system.

With development of technologies such as an open source virtualization kernel-based virtual machine (KVM) technology and a cloud computing OPENSTACK technology, a size of a cluster will exponentially increase in the future, and a problem of cluster management performed by a service layer is increasingly prominent. Therefore, how to organize a cluster architecture relationship is very crucial in the cluster management, especially for fast detection of a faulty node.

Currently, a method used by a cluster system to organize nodes is as follows. The cluster system includes multiple nodes, where each node in the cluster can be used as a seed node. An external ordinary node randomly selects different nodes to establish neighbor relationships when the external ordinary node joins the cluster, at different moments. For example, at a first moment, an ordinary node A randomly selects a node B in the cluster system as a neighbor node, and the node A may share, according to a neighbor relationship with the node B, information about the node A with the node B, and at a second moment, the node A randomly selects a node C in the cluster system as a neighbor node, and the node A may share, according to a neighbor relationship with the node C, information about the node A with the node C. The node A may receive information shared by another node when the other node selects the node A as a neighbor node.

In other approaches, there is an uncertain relationship between a node and a neighbor node in a cluster system at different moments, which is inconducive to maintaining high availability of the cluster system.

SUMMARY

Embodiments of the present disclosure provide a cluster system self-organizing method, a device, and a cluster system in order to maintain high availability of a topology structure of the cluster system.

According to a first aspect, an embodiment of the present disclosure provides a cluster system self-organizing method, including receiving, by a node A in a cluster system, a request message sent by an external node for requesting to join the cluster system, where the cluster system includes at least two nodes, the node A is one node in the cluster system, the node A and at least one another node in the cluster system mutually have a bidirectional neighbor relationship, and two nodes that have the bidirectional neighbor relationship mutually transmit information, separately determining, by the node A, whether ratios of a space area that is of the node A and that is allocated in the cluster system to space areas that are of bidirectional neighbor nodes of the node A and that are allocated in the cluster system meet a preset relationship, where when the cluster system includes only one node, a two-dimensional coordinate system is established using the one node as an origin, in the two-dimensional coordinate, a cluster area is allocated to the cluster system, and the entire cluster area is allocated to the one node, and a space area that is occupied in the cluster area by the one node is reduced, and a space area in the cluster area is respectively allocated to the at least one joined external node when at least one external node joins the cluster system, and if the preset relationship is met, establishing, by the node A, the bidirectional neighbor relationship with the external node in order to ensure that nodes are evenly distributed in the cluster system and avoid centralized distribution of nodes in the cluster system.

Optionally, the method further includes sending, by the node A to the external node, information about at least one node except the node A in the cluster system if a ratio of a space area that is of the node A and that is allocated in the cluster system to a space area that is of at least one bidirectional neighbor node of the node A and that is allocated in the cluster system does not meet the preset relationship such that the external node joins the cluster system using the other node.

Optionally, sending, by the node A to the external node, information about at least one node except the node A in the cluster system includes sending, by the node A according to space areas that are of all nodes in the cluster system and that are allocated in the cluster system, information about the at least one node to the external node if a ratio of a space area that is of at least one node and that is allocated in the cluster system to a space area that is of each bidirectional neighbor node of the at least one node and that is allocated in the cluster system meets the preset relations.

Optionally, the method further includes obtaining, by the node A using a bidirectional neighbor node of the node A, a message that the external node has joined the cluster system using another node except the node A in the cluster system.

Optionally, the method further includes sending, by the node A to the external node, information about a node that mutually has the bidirectional neighbor relationship with the node A, where the information is used by the external node to establish the bidirectional neighbor relationship with the other node except the node A in the cluster system.

Optionally, the method further includes receiving, by the node A, a notification message that the external node has established the bidirectional neighbor relationship with the other node except the node A in the cluster system.

Optionally, receiving, by the node A, a notification message that the external node has established the bidirectional neighbor relationship with the other node except the node A in the cluster system includes receiving, by the node A, a notification message that the external node has established the bidirectional neighbor relationship with the bidirectional neighbor node of the node A.

Optionally, receiving, by the node A, a notification message that the external node has established the bidirectional neighbor relationship with the other node except the node A in the cluster system includes receiving, by the node A, the notification message using another bidirectional neighbor node of the external node and/or the node A.

Optionally, after establishing, by the node A, the bidirectional neighbor relationship with the external node, the method further includes sending, by the node A to another bidirectional neighbor node of the node A except the external node, a message that the node A has established the bidirectional neighbor relationship with the external node such that the message that the external node has joined the cluster system is shared in the entire cluster system using the bidirectional neighbor node of the node A.

Optionally, the method further includes obtaining, by the node A using the bidirectional neighbor node of the node A, a message that another new node has joined the cluster system.

According to a second aspect, an embodiment of the present disclosure provides a cluster system self-organizing method, including sending, by an external node to a node A in a cluster system, a request message for requesting to join the cluster system, where the cluster system includes at least two nodes, the node A is one node in the cluster system, the node A and at least one another node in the cluster system mutually have a bidirectional neighbor relationship, and two nodes that have the bidirectional neighbor relationship mutually transmit information, and establishing, by the external node, the bidirectional neighbor relationship with the node A when the node A allows the external node to join the cluster system.

Optionally, the method further includes receiving, by the external node, information that is sent by the node A and that is about at least one node except the node A in the cluster system when the node A does not allow the external node to join the cluster system, and establishing, by the external node according to the information about at least one node except the node A, the bidirectional neighbor relationship with one of nodes except the node A in the cluster system.

Optionally, receiving, by the external node, information that is sent by the node A and that is about at least one node except the node A in the cluster system includes receiving, by the external node, information that is sent by the node A and that is about the at least one node if a ratio of a space area that is of at least one node and that is allocated in the cluster system to a space area that is of each bidirectional neighbor node of the at least one node and that is allocated in the cluster system meets the preset relations, and correspondingly, establishing, by the external node according to the information about at least one node except the node A, the bidirectional neighbor relationship with one of nodes except the node A in the cluster system includes establishing, by the external node, the bidirectional neighbor relationship with any one of the at least one node if a ratio of a space area that is of at least one node and that is allocated in the cluster system to a space area that is of each bidirectional neighbor node of the at least one node and that is allocated in the cluster system meets the preset relations.

Optionally, for the external node, when the node A allows the external node to join the cluster system, the method further includes receiving, by the external node, information that is sent by the node A and that is about a node that mutually has the bidirectional neighbor relationship with the node A, and establishing, by the external node according to the information about a node that mutually has the bidirectional neighbor relationship with the node A, the bidirectional neighbor relationship with a bidirectional neighbor node of the node A.

Optionally, after establishing the bidirectional neighbor relationship with a bidirectional neighbor node of the node A, the method further includes sending, by the external node, to the node A, information that the external node has established the bidirectional neighbor relationship with the bidirectional neighbor node of the node A.

According to a third aspect, an embodiment of the present disclosure provides a cluster system self-organizing apparatus, where the apparatus is deployed on a node A in a cluster system, and the apparatus includes a receiving module configured to receive a request message sent by an external node for requesting to join the cluster system, where the cluster system includes at least two nodes, the node A is one node in the cluster system, the node A and at least one another node in the cluster system mutually have a bidirectional neighbor relationship, and two nodes that have the bidirectional neighbor relationship mutually transmit information, a determining module configured to separately determine whether ratios of a space area that is of the node A and that is allocated in the cluster system to space areas that are of bidirectional neighbor nodes of the node A and that are allocated in the cluster system meet a preset relationship, where when the cluster system includes only one node, a two-dimensional coordinate system is established using the one node as an origin, in the two-dimensional coordinate, a cluster area is allocated to the cluster system, and the entire cluster area is allocated to the one node, and a space area that is occupied in the cluster area by the one node is reduced, and a space area in the cluster area is respectively allocated to the at least one joined external node when at least one external node joins the cluster system, and a neighbor relationship establishing module configured to establish the bidirectional neighbor relationship between the node A and the external node in order to ensure that nodes are evenly distributed in the cluster system and avoid centralized distribution of nodes in the cluster system when the preset relationship is met.

Optionally, the apparatus further includes a first sending module configured to send, to the external node, information about at least one node except the node A in the cluster system when a ratio of a space area that is of the node A and that is allocated in the cluster system to a space area that is of at least one bidirectional neighbor node of the node A and that is allocated in the cluster system does not meet the preset relationship such that the external node joins the cluster system using the other node.

Optionally, the first sending module is further configured to send, according to space areas that are of all nodes in the cluster system and that are allocated in the cluster system, information about the at least one node to the external node if a ratio of a space area that is of at least one node and that is allocated in the cluster system to a space area that is of each bidirectional neighbor node of the at least one node and that is allocated in the cluster system meets the preset relations.

Optionally, the receiving module is further configured to obtain, using the bidirectional neighbor node of the node A, a message that the external node has joined the cluster system using another node except the node A in the cluster system.

Optionally, the apparatus further includes a second sending module configured to send, to the external node, information about a node that mutually has the bidirectional neighbor relationship with the node A, where the information is used by the external node to establish the bidirectional neighbor relationship with another node except the node A in the cluster system.

Optionally, the receiving module is further configured to receive a notification message that the external node has established the bidirectional neighbor relationship with the other node except the node A in the cluster system.

Optionally, the receiving module is further configured to receive a notification message that the external node has established the bidirectional neighbor relationship with the bidirectional neighbor node of the node A.

Optionally, the receiving module is further configured to receive the notification message using another bidirectional neighbor node of the external node and/or the node A.

Optionally, the apparatus further includes a third sending module configured to send, to another bidirectional neighbor node of the node A except the external node, a message that the node A has established the bidirectional neighbor relationship with the external node such that the message that the external node has joined the cluster system is shared in the entire cluster system using the bidirectional neighbor node of the node A.

Optionally, the receiving module is further configured to obtain, using the bidirectional neighbor node of the node A, a message that another new node has joined the cluster system.

According to a fourth aspect, an embodiment of the present disclosure provides a cluster system self-organizing apparatus, where the apparatus is deployed on an external node and includes a sending module configured to send, to a node A in a cluster system, a request message for requesting to join the cluster system, where the cluster system includes at least two nodes, the node A is one node in the cluster system, the node A and at least one another node in the cluster system mutually have a bidirectional neighbor relationship, and two nodes that have the bidirectional neighbor relationship mutually transmit information, and a neighbor relationship establishing module configured to establish the bidirectional neighbor relationship between the external node and the node A when the node A allows the external node to join the cluster system.

Optionally, the apparatus further includes a first receiving module configured to receive information that is sent by the node A and that is about at least one node except the node A in the cluster system when the node A does not allow the external node to join the cluster system, and correspondingly, the neighbor relationship establishing module is further configured to establish, according to the information about at least one node except the node A, the bidirectional neighbor relationship between the external node and one of nodes except the node A in the cluster system.

Optionally, the first receiving module is further configured to receive information that is sent by the node A and that is about the at least one node if a ratio of a space area that is of at least one node and that is allocated in the cluster system to a space area that is of each bidirectional neighbor node of the at least one node and that is allocated in the cluster system meets the preset relations, and correspondingly, the neighbor relationship establishing module is further configured to establish the bidirectional neighbor relationship between the external node and any one of the at least one node if a ratio of a space area that is of at least one node and that is allocated in the cluster system to a space area that is of each bidirectional neighbor node of the at least one node and that is allocated in the cluster system meets the preset relations.

Optionally, the apparatus further includes a second receiving module configured to receive information that is sent by the node A and that is about a node that mutually has the bidirectional neighbor relationship with the node A when the node A allows the external node to join the cluster system, and correspondingly, the neighbor relationship establishing module is further configured to establish, according to the information about a node that mutually has the bidirectional neighbor relationship with the node A, the bidirectional neighbor relationship between the external node and a bidirectional neighbor node of the node A.

Optionally, the sending module is further configured to send, to the node A, information that the bidirectional neighbor relationship has been established between the external node and the bidirectional neighbor node of the node A.

According to a fifth aspect, an embodiment of the present disclosure provides a node device, where the node device is configured to be deployed on a node in a cluster system and includes a communications interface, a memory, a processor, and a communications bus, where the communications interface, the memory, and the processor communicate using the communications bus. The memory is configured to store a program, and the processor is configured to execute the program stored in the memory. The communications interface is configured to receive a request message sent by an external node for requesting to join the cluster system, where the cluster system includes at least two nodes, a node that receives the request message is a node A, the node A is one node in the cluster system, the node A and at least one another node in the cluster system mutually have a bidirectional neighbor relationship, and two nodes that have the bidirectional neighbor relationship mutually transmit information, and the processor is configured to separately determine whether a ratio of a space area that is of the node A and that is allocated in the cluster system to a space area that is of each bidirectional neighbor node of the node A and that is allocated in the cluster system meets a preset relationship, where when the cluster system includes only one node, a two-dimensional coordinate system is established using the one node as an origin, in the two-dimensional coordinate, a cluster area is allocated to the cluster system, and the entire cluster area is allocated to the one node, and a space area that is occupied in the cluster area by the one node is reduced, and a space area in the cluster area is respectively allocated to the at least one joined external node when at least one external node joins the cluster system, and establish the bidirectional neighbor relationship between the node A and the external node in order to ensure that nodes are evenly distributed in the cluster system and avoid centralized distribution of nodes in the cluster system if the preset relationship is met.

According to a sixth aspect, an embodiment of the present disclosure provides a node device, where the node device is configured to be deployed on a node outside a cluster system and includes a communications interface, a memory, a processor, and a communications bus, where the communications interface, the memory, and the processor communicate using the communications bus. The memory is configured to store a program, and the processor is configured to execute the program stored in the memory. The communications interface is configured to send, to a node A in the cluster system, a request message for requesting to join the cluster system, where the cluster system includes at least two nodes, the node A is one node in the cluster system, the node A and at least one another node in the cluster system mutually have a bidirectional neighbor relationship, and two nodes that have the bidirectional neighbor relationship mutually transmit information, and the processor is configured to establish the bidirectional neighbor relationship with the node A when the node A allows the external node to join the cluster system.

According to a seventh aspect, an embodiment of the present disclosure provides a cluster system, where the cluster system includes at least two nodes and a newly added node B, a node A is one node of the at least two nodes, and a process that the newly added node joins the cluster system includes receiving, by the node A, a request message sent by the node B for requesting to join the cluster system, where the node A and at least one another node in the cluster system mutually have a bidirectional neighbor relationship, and two nodes that have the bidirectional neighbor relationship mutually transmit information, separately determining, by the node A, whether a ratio of a space area that is of the node A and that is allocated in the cluster system to a space area that is of each bidirectional neighbor node of the node A and that is allocated in the cluster system meets a preset relationship, where when the cluster system includes only one node, a two-dimensional coordinate system is established using the one node as an origin, in the two-dimensional coordinate, a cluster area is allocated to the cluster system, and the entire cluster area is allocated to the one node, and a space area that is occupied in the cluster area by the one node is reduced, and a space area in the cluster area is respectively allocated to the at least one joined external node when at least one external node joins the cluster system, and establishing, by the node A, the bidirectional neighbor relationship with the node B in order to ensure that nodes are evenly distributed in the cluster system and avoid centralized distribution of nodes in the cluster system if the preset relationship is met.

In the present disclosure, nodes in a cluster system maintain a fixed bidirectional neighbor relationship. The external node establishes a bidirectional neighbor relationship with any node in the cluster system when a new external node joins the cluster system, which changes only a local neighbor relationship of the cluster system without affecting an entire topology structure of the cluster system in order to maintain stability of the topology structure of the cluster system. In addition, the bidirectional neighbor relationship between nodes facilitates fast spreading of node information in the entire cluster system. Especially when a node in the cluster is faulty, the bidirectional neighbor relationship between nodes facilitates fast diagnosis and detection of the faulty node. Therefore, a cluster system established using the method can maintain relatively high availability.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show some embodiments of the present disclosure, and persons of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are some but not all of the embodiments of the present disclosure. All other embodiments obtained by persons of ordinary skill in the art based on the embodiments of the present disclosure without creative efforts shall fall within the protection scope of the present disclosure.

A clustering technology is a relatively new technology. Using the clustering technology, a relatively high profit can be obtained in aspects such as performance, reliability, and flexibility at a relatively low cost.

A cluster system generally includes multiple nodes, and a certain neighbor relationship is established between the nodes in order to maintain association between nodes, and facilitate transmission of service information in the cluster system.

Figure 1:
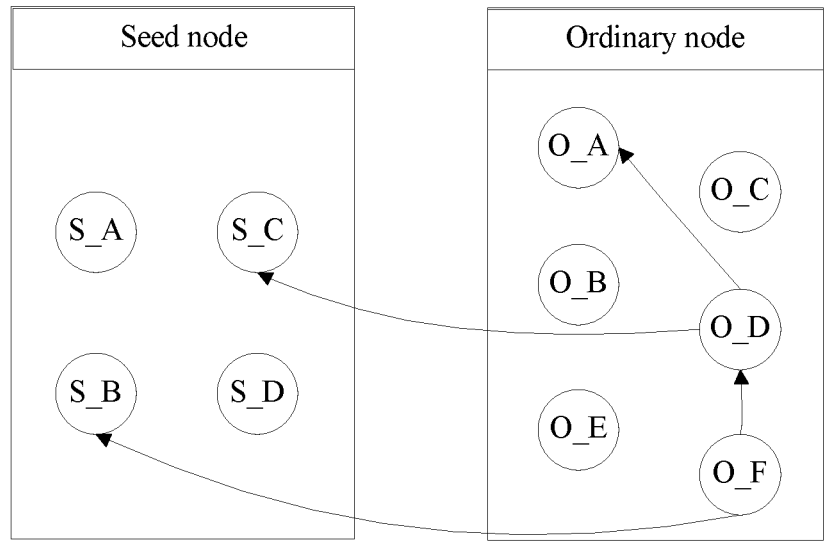
FIG. 1 is a schematic diagram of a state of organizing a cluster structure.

FIG. 1 is a schematic diagram of a state of organizing a cluster structure.

Figure 2:
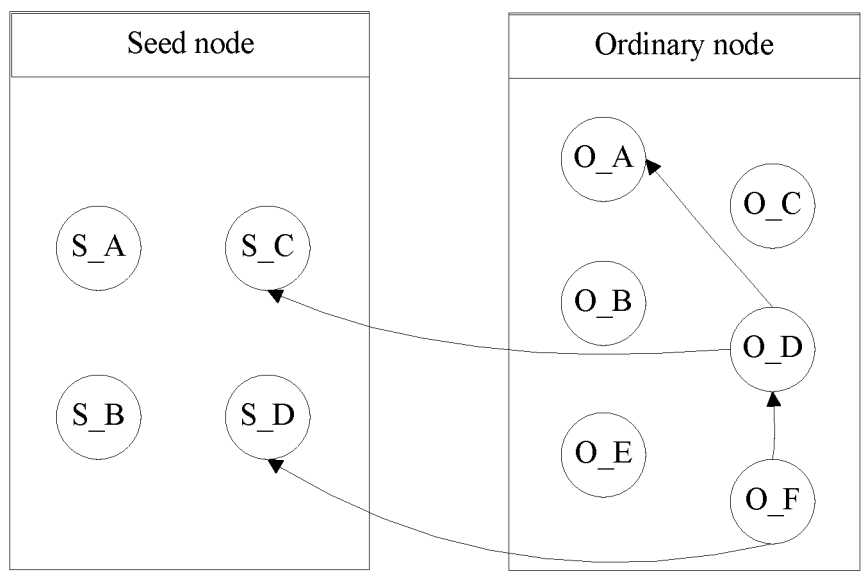
FIG. 2 is a schematic diagram of another state of organizing a cluster structure.

FIG. 2 is a schematic diagram of another state of organizing a cluster structure.

As shown in FIG. 1 and FIG. 2, any node in the cluster system can be used as a seed node, and a node outside the cluster system is an ordinary node. A node in a cluster or outside a cluster may select any seed node (designated as S_A, S_B, S_C, and S_D) and another ordinary node (designated as O_A, O_B, O_C, O_D, O_E, and O_F) as a neighbor node, and may select different neighbor nodes at different moments.

For example, as shown in FIG. 1, at a first moment, the node O_F selects a node S_B and a node O_D as neighbor nodes of the node O_F, and the node O_D selects a node S_C and a node O_A as neighbor nodes of the node O_D. A neighbor relationship established between nodes is a unidirectional and independent neighbor relationship. For example, the node O_D is a neighbor node of the node O_F.

Therefore, the node O_F may share information held by the node O_F with the node O_D. However, the node O_F is not a neighbor node of the node O_D. Therefore, the node O_D does not share information held by the node O_D with the node O_F. It can be learned that a unidirectional neighbor relationship is established between the nodes.

As shown in FIG. 2, at a second moment, the node O_F selects a node S_D and the node O_D as neighbor nodes of the node O_F, and the node O_D selects the node S_C and the node O_A as neighbor nodes of the node O_D. It can be learned that the neighbor nodes selected by the node O_F and the node O_D at the second moment are different from the neighbor nodes selected by the node O_F and the node O_D at the first moment, that is, neighbor relationships between single nodes are different at different moments.

It can be learned that the following problems exist in an existing method for organizing a cluster system structure.

(1) A random neighbor relationship: A node in the cluster randomly selects one or more nodes as neighbor nodes of the node, and neighbor relationships are different at different moments.

(2) A unidirectional neighbor relationship: Random selection of a neighbor node causes unidirectional node information synchronization.

In a cluster system, a node in a cluster has a random and unidirectional neighbor relationship. Therefore, a topology structure of the cluster is relatively unstable, a node information transmission speed is relatively low, and the node in the cluster cannot fast diagnose or detect a state of another node in the cluster, which greatly affects high availability of the cluster.

To resolve the problems existing in other approaches caused when a cluster system structure is organized, an embodiment of the present disclosure provides a cluster system self-organizing method. In the method, an external node (corresponding to an ordinary node in FIG. 1 and FIG. 2) may randomly select any node in a cluster system as a seed node, and establish a bidirectional neighbor relationship with the selected node. The bidirectional neighbor relationship refers to bidirectional synchronization of information between nodes. For example, a node A selects a node B as a neighbor node of the node A, and the node B also selects the node A as a neighbor of the node B. This organization structure in the cluster system facilitates stability of a topology structure of the cluster system, and facilitates fast spreading of node information in the cluster system. Especially the organization structure supports fast diagnosis of the faulty node in order to maintain high availability of the cluster system when any node in the cluster system is faulty.

In this embodiment of the present disclosure, a same agent may be deployed on all nodes in the cluster system in order to maintain consistency of a rule of a method performed by all nodes.

Figure 3:
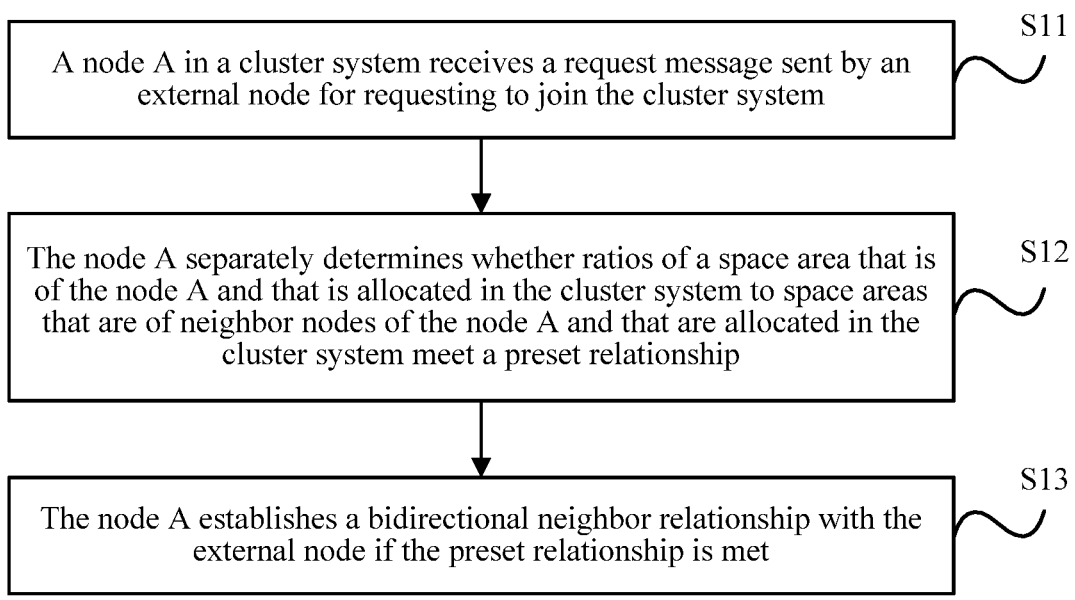
FIG. 3 is a flowchart of a cluster system self-organizing method according to an embodiment of the present disclosure.

FIG. 3 is a flowchart of a cluster system self-organizing method according to an embodiment of the present disclosure. The method is executed by any node in a cluster system, and includes the following steps.

Step S11: A node A in the cluster system receives a request message sent by an external node for requesting to join the cluster system.

In this embodiment, the cluster system includes at least two nodes, the node A is one node in the cluster system, the node A and at least one another node in the cluster system mutually have a bidirectional neighbor relationship, and two nodes that have the bidirectional neighbor relationship mutually transmit information.

When a new node (a corresponding external node) joins the cluster system, the external node selects any node in the cluster system as a joined node, and sends a request message to the selected node.

Step S12: The node A separately determines whether a ratio of a space area that is of the node A and that is allocated in the cluster system to a space area that is of each bidirectional neighbor node of the node A and that is allocated in the cluster system meets a preset relationship.

When the cluster system includes only one node, a two-dimensional coordinate system is established using the one node as an origin, in the two-dimensional coordinate, a cluster area is allocated to the cluster system, and the entire cluster area is allocated to the one node, and a space area that is occupied in the cluster area by the one node is reduced, and a space area in the cluster area is respectively allocated to at least one joined external node when the at least one external node joins the cluster system.

Figure 7:
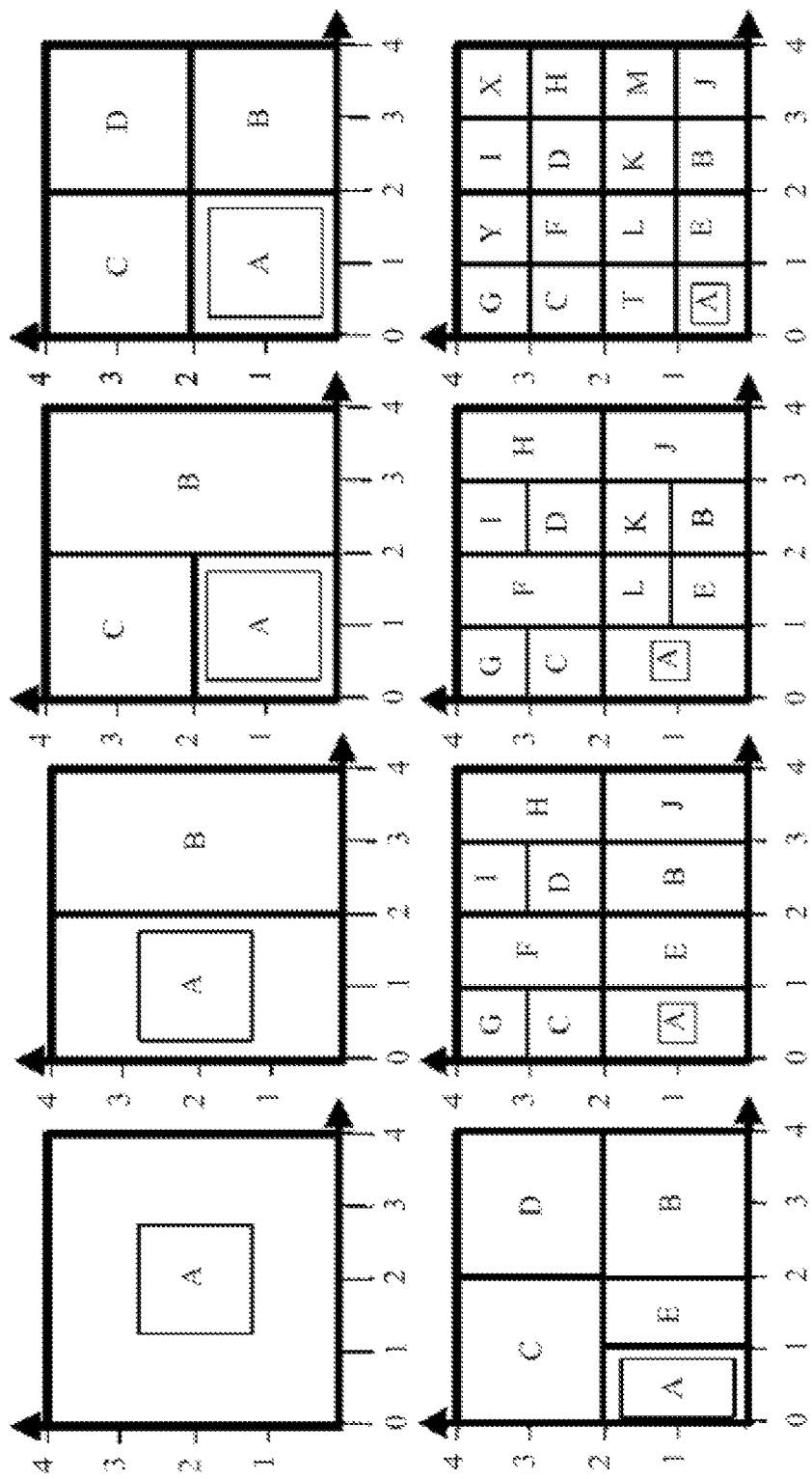
FIG. 7 is a schematic diagram of an effect obtained when all nodes join a cluster system.

FIG. 7 is a schematic diagram of an effect obtained when all nodes join a cluster system. As shown in FIG. 7, when the cluster system includes only a node A, a two-dimensional coordinate system (O-xy) is established using the node A as an origin, in the O-xy, a cluster area is allocated to the cluster system, where the cluster area is a virtual area that is set arbitrarily, and is used to represent a space architecture or a space layout between all node spaces in the cluster system. As shown in the first subdiagram in the first row in FIG. 7, four coordinate points for determining a cluster area are respectively (0, 0), (0, 4), (4, 0), and (4, 4), and the cluster area is 16. The entire cluster area is allocated to the node A when the cluster system includes only the node A.

When an external node joins the cluster system using the node A, the node A allocates, to the external node, a part of the space area allocated to the node A. As shown in FIG. 7, after a node B joins the cluster system using the node A, the node A allocates, to the node B, a part of the space area allocated to the node A, where a proportional relationship of a space area allocated by the node A to the node B may be set according to an actual application scenario, for example, ½, ⅓, . . . , or 1/n of the space area allocated to the node A is allocated to a newly joined external node.

As shown in FIG. 7, when an external node C joins the cluster system still using the node A, the node A compares the space area allocated to the node A with the space area allocated to the neighbor node B. When a ratio between two nodes meets a preset relationship, the node A allows the node C to join the cluster system using the node A, and allocates, to the node C, a part of a space area currently allocated to the node A. In this embodiment, whether a ratio between space areas allocated to the node A and a neighbor node meets the preset relationship may be determined according to a space area allocated by the node A to an external node each time. A general principle includes that after the external node joins the cluster system, it is ensured that a space allocated to the node A is not excessively less than a space area allocated to the neighbor node of the node A in order to ensure stability of a network structure in the cluster system.

For example, in FIG. 7, the node A allocates, to the node B, ½ of the space area allocated to the node A. The node A allocates again, to the node C, ½ of a remaining space area allocated to the node A when the node C joins the cluster system. When the node D joins the cluster system, if the node A allocates again, to the node D, ½ of a remaining space area allocated to the node A, a space area allocated to the node A is excessively less than the space area allocated to the node B. In this case, the node D joins the cluster system using the node B.

In FIG. 7, an example in which ½ of an area is allocated each time is used for description. In an actual application, the node A may each time allocate ½, ⅓, . . . , or 1/n of a space area allocated to the node A. Examples are not described in this embodiment of the present disclosure.

In this embodiment, when determining whether to allow an external node to join the cluster system, the node A determines whether ratios of a space area that is of the node A and that is allocated in the cluster system to space areas that are of bidirectional neighbor nodes of the node A and that are allocated in the cluster system meet the preset relationship. As shown in the first subdiagram in the second row in the FIG. 7, when a node F joins the cluster system using the node A, the node A separately determines whether ratios of a space area allocated to the node A to space areas allocated to bidirectional neighbor nodes (that is, a node E and the node C) of the node A meet a preset ratio relationship, for example, whether 1:1 or 2:1 is met. According to the preset ratio relationship, a ratio relationship between space areas allocated to the node A and the node C does not meet a specified ratio. Therefore, the node A does not allow the node F to join the cluster system using the node A. In such a manner of joining the cluster system, a balance between space areas that are of all nodes and that are allocated in the cluster system is maintained, which helps maintain a balance and stability of a topology structure of the cluster system.

Step S13: The node A establishes a bidirectional neighbor relationship with the external node if the preset relationship is met.

When allowing the external node that sends the request message to join the cluster system, the node A establishes the bidirectional neighbor relationship with the external node in order to ensure that nodes are evenly distributed in the cluster system and avoid centralized distribution of nodes in the cluster system. Further, the node A further allocates, to a joined external node according to the preset relationship, a space area allocated to the node A.

In this embodiment, nodes in a cluster system maintain a fixed bidirectional neighbor relationship. An external node establishes a bidirectional neighbor relationship with any node in the cluster system when the external node joins the cluster system, which changes only a local neighbor relationship of the cluster system without affecting an entire topology structure of the cluster system in order to maintain stability of the topology structure of the cluster system. In addition, the bidirectional neighbor relationship between nodes facilitates fast spreading of node information in the entire cluster system. Especially the bidirectional neighbor relationship between nodes facilitates fast diagnosis and detection of the faulty node when a node in the cluster is faulty. Therefore, a cluster system established using the method can maintain relatively high availability.

The cluster system self-organizing method of this embodiment may be applied to a cloud computing server cluster system. Further, at least two servers are deployed in the cloud computing server cluster system. Any server in the cluster system establishes a neighbor relationship with another server in the cluster system in order to implement data transmission in the cluster system.

In an existing method, any server in the cloud computing server cluster system selects at least one another server in the cluster system to establish a unidirectional neighbor relationship. That is, after the server selects the at least one another server in the cluster as a neighbor of the server, the server may send information to a neighbor server of the server, but the neighbor server of the server does not send information about the neighbor server to the server. In addition, the server may change a neighbor at different moments. It can be learned that, in an existing cloud computing server cluster system, a unidirectional neighbor relationship is established between nodes, and transmission of information about a server is unidirectional, which is inconducive to spreading of server information in the cluster system. In addition, a server may select different neighbors at different moments. Therefore, a topology structure of the cluster system is unstable, which is inconducive to maintaining high availability of the cloud computing server cluster system.

To maintain high availability of the cloud computing server cluster system, in the method, a server deployed in the cloud computing server cluster system establishes a bidirectional neighbor relationship with a neighbor server of the server. After a server, for example, a server A, selects at least one server in the cluster as a neighbor server, the server A establishes the bidirectional neighbor relationship with a neighbor of the server A. That is, the server A and a bidirectional neighbor server of the server A may mutually transmit information. In addition, at different moments, the bidirectional neighbor relationship between servers remains unchanged.

Further, when an external server outside the cloud computing server cluster system sends a request-to-join message to one of servers in the cluster, a server that receives the message determines, according to whether a ratio of a space area pre-stored by the server to a space area of a bidirectional neighbor server of the server meets a preset relationship, whether to allow the external server to join the cluster system. The server allows the external server to join the cluster system if the preset relationship is met, or the server sends information about another server in the cluster system to the external server such that the external server joins the cloud computing server cluster system using the other server if the preset relationship is not met. All servers in the cloud computing server cluster system correspond to concepts of nodes in the foregoing. A method for allocating space areas to all servers in the cloud computing server cluster system is the same as the manner in FIG. 7 of Embodiment 1, and details are not described again.

It can be learned that, in the present disclosure, servers in a cloud computing server cluster system maintain a fixed bidirectional neighbor relationship. A new external server establishes a bidirectional neighbor relationship with any server in the cluster system when the new external server joins the cluster system, which changes only a local neighbor relationship of the cluster system without affecting an entire topology structure of the cluster system in order to maintain stability of the topology structure of the cluster system. In addition, the bidirectional neighbor relationship between servers facilitates fast spreading of server information in the entire cluster system. Especially the bidirectional neighbor relationship between servers facilitates fast diagnosis and detection of a faulty server when a server in the cluster is faulty. Therefore, a cluster system established using the method can maintain relatively high availability.

Figure 4:
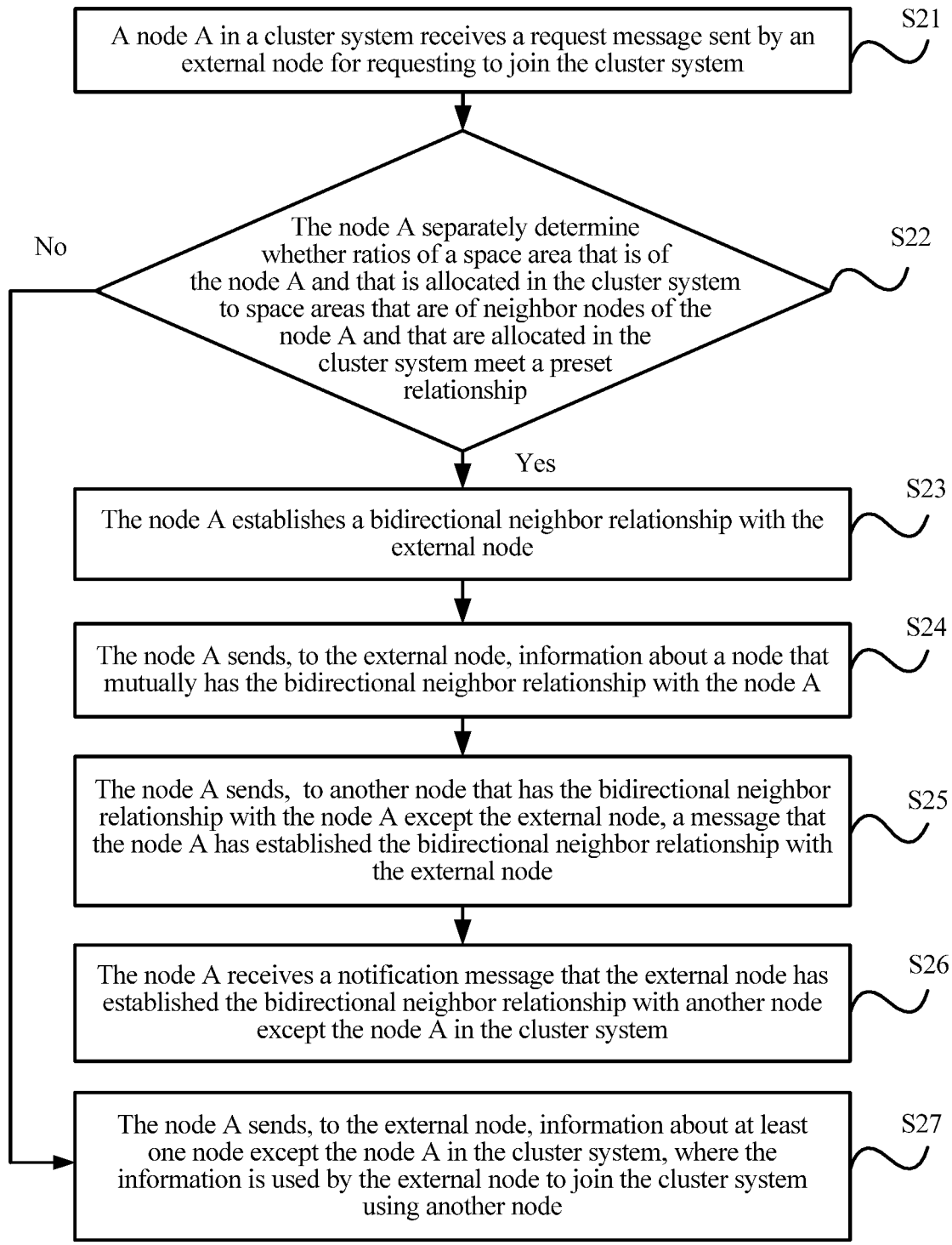
FIG. 4 is another flowchart of a cluster system self-organizing method according to an embodiment of the present disclosure.

FIG. 4 is another flowchart of a cluster system self-organizing method according to an embodiment of the present disclosure. Based on Embodiment 1, the method describes, in further detail, fast transmission based on bidirectional neighbor relationship information in a cluster system. The method of this embodiment is executed by any node in the cluster system, and includes the following steps.

Step S21: A node A in the cluster system receives a request message sent by an external node for requesting to join the cluster system.

The cluster system includes at least two nodes, the node A is one node in the cluster system, the node A and at least one another node in the cluster system mutually have a bidirectional neighbor relationship, and two nodes that have the bidirectional neighbor relationship mutually transmit information. In addition, a neighbor relationship between other nodes in the cluster system is also a bidirectional neighbor relationship.

Figure 5:
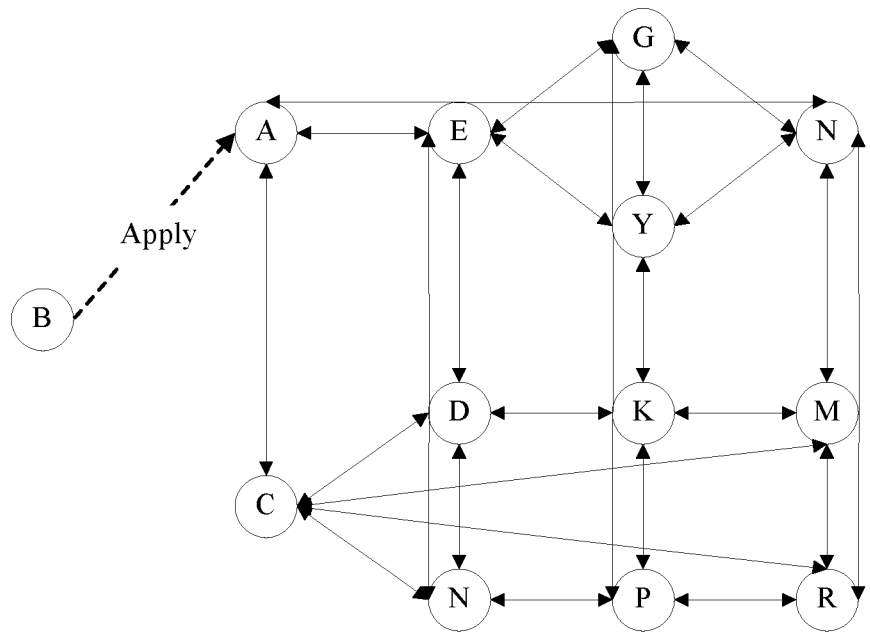
FIG. 5 is a schematic diagram of an effect obtained when any node requests to join a cluster system.

FIG. 5 is a schematic diagram of an effect obtained when any node requests to join a cluster system.

As shown in FIG. 5, a node B randomly selects any node in the cluster system as a joined node, and sends, to the node, a request message for requesting to join the cluster system, and the node A receives the request message sent by the node B.

Step S22: The node A separately determines whether ratios of a space area that is of the node A and that is allocated in the cluster system to space areas that are of neighbor nodes of the node A and that are allocated in the cluster system meet a preset relationship, step S23 is performed if the preset relationship is met, or step S27 is performed if the preset relationship is not met.

In this embodiment, a method used by the node A to determine whether to allow an external node to join the cluster system is the same as that in Embodiment 1, and details are not described again.

As shown in FIG. 5, after receiving the request message sent by the node B, the node A determines whether ratios of a space area that is of the node A and that is allocated in the cluster system to space areas of bidirectional neighbor nodes C, E, and N meet the preset relationship, for example, whether a relationship of n:1 is met, where a value of n is an integer, such as 1, 2, or 3 . . . . The node A allows the external node B to join the cluster system if the preset relationship is met.

Step S23: The node A establishes a bidirectional neighbor relationship with the external node.

As shown in FIG. 5, when the node A determines that the ratios of the space area that is of the node A and that is allocated in the cluster system to the space areas that are of the bidirectional neighbor nodes of the node A and that are allocated in the cluster system meet the preset relationship, the node A establishes the bidirectional neighbor relationship with the node B.

Step S24: The node A sends, to the external node, information about a node that mutually has the bidirectional neighbor relationship with the node A.

The node A sends, to the external node, information about the node that establishes the bidirectional neighbor relationship with the node A, and the external node establishes, according to the received information, the bidirectional neighbor relationship with another node except the node A in the cluster system. Preferably, the external node establishes the bidirectional neighbor relationship with a bidirectional neighbor node of the node A.

As shown in FIG. 5, the node A sends, to the node B, information about bidirectional neighbor nodes C, E, and N of the node A in order to implement information sharing after the node A determines to allow the node B to join the cluster system.

Step S25: The node A sends, to another node that has the bidirectional neighbor relationship with the node A except the external node, a message that the node A has established the bidirectional neighbor relationship with the external node.

In this embodiment, after the node A establishes the bidirectional neighbor relationship with the external node, the node A sends, to another node that has the bidirectional neighbor relationship with the node A except the external node, the message that the node A has established the bidirectional neighbor relationship with the external node, and another node may transmit the message to a bidirectional neighbor node of the other node such that a message that a new node has joined the cluster system can be quickly transmitted to the entire cluster system, which overcomes problems of unidirectional information transmission between nodes and a relatively low transmission speed in the prior art.

As shown in FIG. 5, after the node A establishes the bidirectional neighbor relationship with the node B, the node A sends, to the bidirectional neighbor nodes of the node A, that is, to the node C, the node E, and the node N, information that the node A has established the bidirectional neighbor relationship with the node B. The node C, the node E, and the node N may further respectively send, to neighbors of the node C, the node E, and the node N, information that the node B has joined the cluster system and established the bidirectional neighbor relationship with the node A, until the information is transmitted to the entire system.

Step S26: The node A receives a notification message that the external node has established the bidirectional neighbor relationship with another node except the node A in the cluster system.

After receiving information that is sent by the node A and that indicates that the node A already has a bidirectional neighbor node, the external node establishes, according to the received message, the bidirectional neighbor relationship with the other node except the node A in the cluster system, and informs the node A of a message that the external node has established the neighbor relationship with the other node. The node A may transmit the message in an entire system using the bidirectional neighbor node of the node A.

Preferably, after a bidirectional connection is established between the external node and the bidirectional neighbor node of the node A, the external node informs the node A of information that the external node has established the bidirectional neighbor relationship with the bidirectional neighbor node of the node A.

Figure 6:
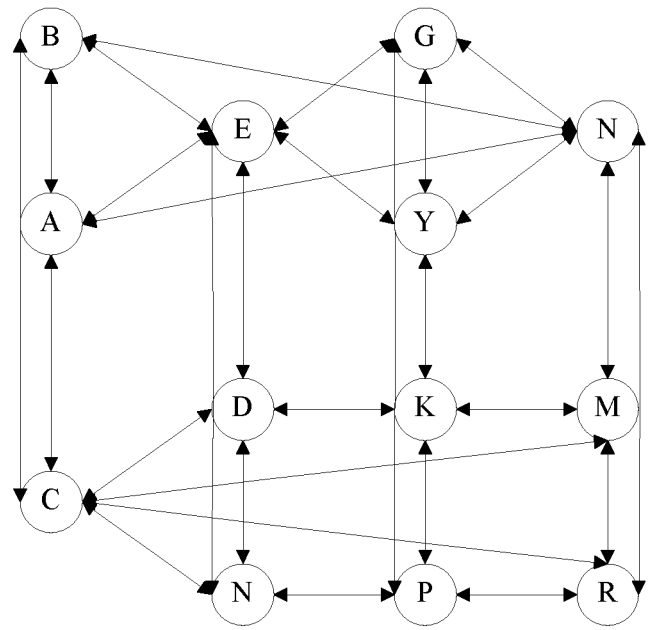
FIG. 6 is a schematic structural diagram obtained after a node B joins a cluster system.

FIG. 6 is a schematic structural diagram obtained after a node B joins a cluster system. As shown in FIG. 6, after the node B receives information that is sent by the node A and that is about bidirectional neighbor nodes of the node A, the node B establishes bidirectional neighbor relationships with all bidirectional neighbor nodes of the node A, that is, the node B further establishes the bidirectional neighbor relationships with the node C, the node E, and the node N.

In addition, after the node B establishes the bidirectional neighbor relationships with the node C, the node E, and the node N, at least one of the node B, the node C, the node E, or the node N sends the information to the node A and another node in the system.

Step S27: The node A sends, to the external node, information about at least one node except the node A in the cluster system, where the information is used by the external node to join the cluster system using another node.

The node A sends information about the other node to the external node when the node A determines not to allow the external node to join the cluster system.

Further, that the node A sends, to the external node, information about at least one node except the node A in the cluster system includes sending, by the node A according to space areas that are of all nodes in the cluster system and that are allocated in the cluster system, information about at least one node to the external node if ratios of a space area that is of the at least one node and that is allocated in the cluster system to space areas that are of bidirectional neighbor nodes of the at least one node and that are allocated in the cluster system meet the preset relationship.

In this embodiment, a method used by the external node to join the cluster system using another node except the node A is the same as the foregoing manner in which the external node joins the cluster system using the node A, and details are not described again.

In addition, because the bidirectional neighbor relationship between nodes in the cluster system is established, the node A may further obtain, using a node that is mutually a neighbor of the node A, a message that external node has joined the cluster system using the other node except the node A in the cluster system.

As shown in FIG. 5, after the node B joins the cluster system using a node G, the node G transmits, using the node E, information about the node B to the node A.

In this embodiment of the present disclosure, the node A may further obtain, using the node that is mutually a neighbor of the node A, a message that another new node has joined the cluster system.

In the method of this embodiment of the present disclosure, when a new node joins the cluster system, a neighbor relationship network of an entire cluster is established based on change of a neighbor relationship between local nodes in order to implement local relationship change in a cluster system and support dynamic infinite extension of the cluster system.

In the method of this embodiment of the present disclosure, when a node is faulty or proactively exits from the cluster, only the neighbor relationship between local nodes is changed in order to maintain stability of a topology structure of the entire cluster.

In the method of this embodiment of the present disclosure, a bidirectional neighbor relationship is established between nodes in order to facilitate fast spreading of information in the cluster system and support fast detection and diagnosis of a faulty node.

Figure 8:
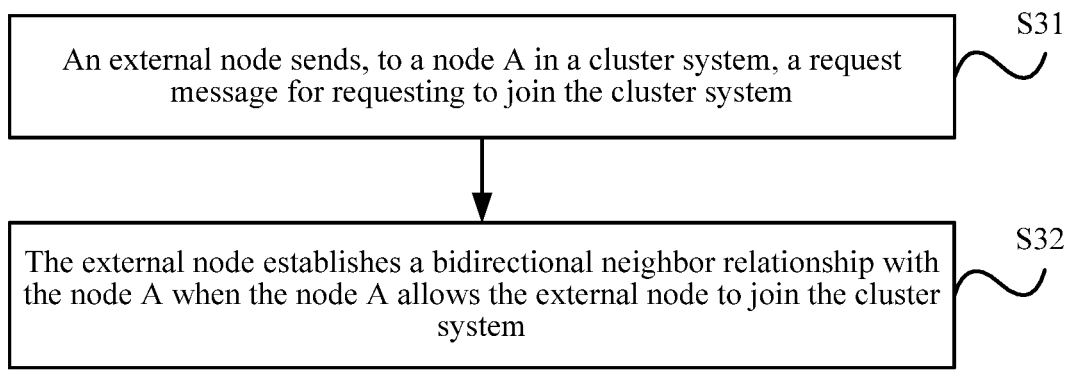
FIG. 8 is still another flowchart of a cluster system self-organizing method according to an embodiment of the present disclosure.

FIG. 8 is still another flowchart of a cluster system self-organizing method according to an embodiment of the present disclosure. The method is executed by any external node that is to join a cluster system and that is outside the cluster system, and includes the following steps.

Step S31: An external node sends, to a node A in the cluster system, a request message for requesting to join the cluster system.

The cluster system includes at least two nodes, the node A is one node in the cluster system, the node A and at least one another node in the cluster system mutually have a bidirectional neighbor relationship, and two nodes that have the bidirectional neighbor relationship mutually transmit information.

Step S32: The external node establishes a bidirectional neighbor relationship with the node A when the node A allows the external node to join the cluster system.

Figure 9:
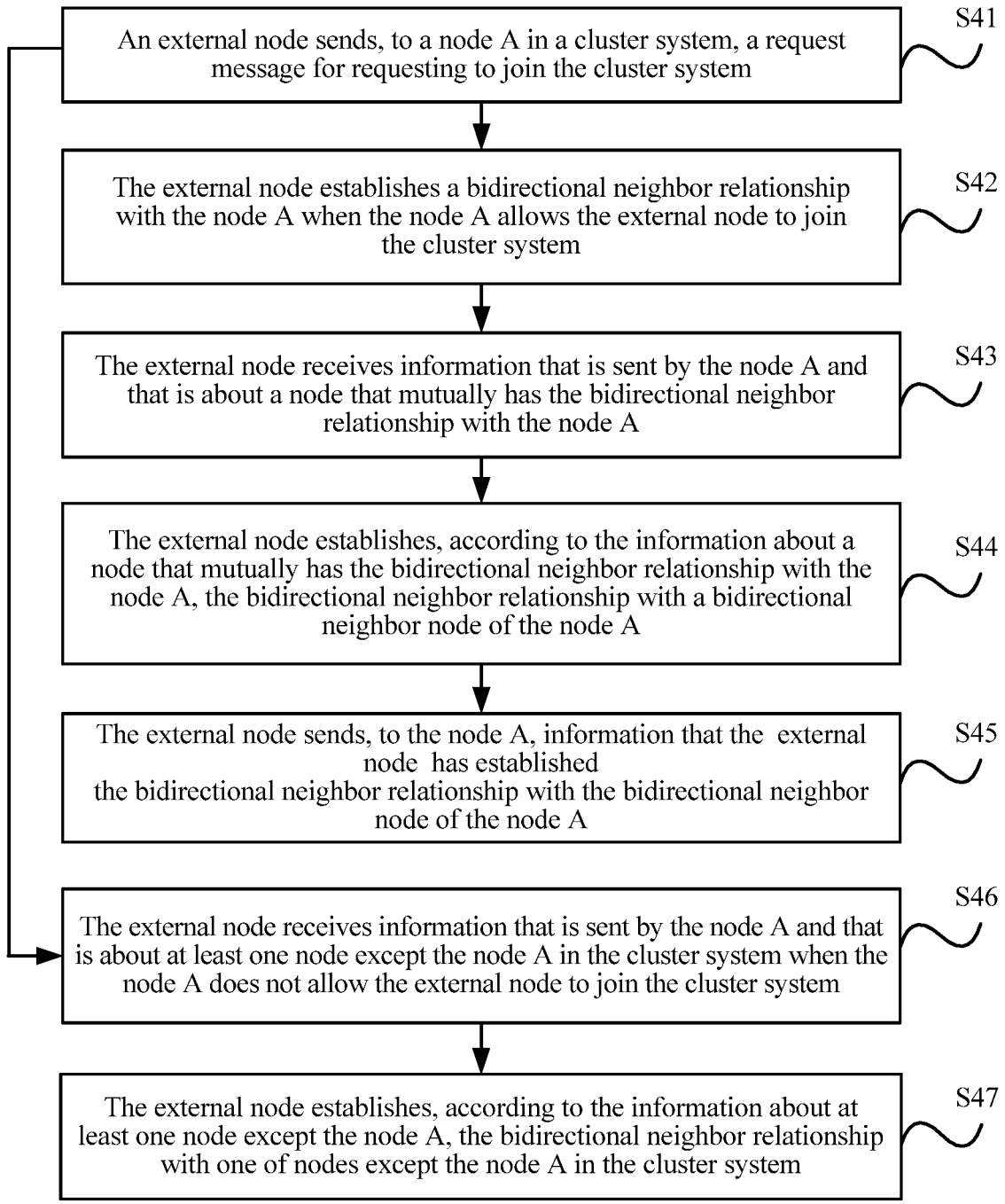
FIG. 9 is yet another flowchart of a cluster system self-organizing method according to an embodiment of the present disclosure.

FIG. 9 is yet another flowchart of a cluster system self-organizing method according to an embodiment of the present disclosure. The method is executed by any external node that is to join a cluster system and that is outside the cluster system, and includes the following steps.

Step S41: An external node sends, to a node A in the cluster system, a request message for requesting to join the cluster system.

The cluster system includes at least two nodes, the node A is one node in the cluster system, the node A and at least one another node in the cluster system mutually have a bidirectional neighbor relationship, and two nodes that have the bidirectional neighbor relationship mutually transmit information.

Step S42: The external node establishes a bidirectional neighbor relationship with the node A when the node A allows the external node to join the cluster system.

Step S43: The external node receives information that is sent by the node A and that is about a node that mutually has the bidirectional neighbor relationship with the node A.

Step S44: The external node establishes, according to the information about a node that mutually has the bidirectional neighbor relationship with the node A, the bidirectional neighbor relationship with a bidirectional neighbor node of the node A.

Step S45: The external node sends, to the node A, information that the external node has established the bidirectional neighbor relationship with the bidirectional neighbor node of the node A.

Step S46: The external node receives information that is sent by the node A and that is about at least one node except the node A in the cluster system when the node A does not allow the external node to join the cluster system.

Step S47: The external node establishes, according to the information about at least one node except the node A, the bidirectional neighbor relationship with one of nodes except the node A in the cluster system.

In this embodiment, that the external node receives information that is sent by the node A and that is about at least one node except the node A in the cluster system includes receiving, by the external node, information that is sent by the node A and that is about at least one node if a ratio of a space area that is of at least one node and that is allocated in the cluster system to a space area that is of each bidirectional neighbor node of the at least one node and that is allocated in the cluster system meets the preset relations.

Correspondingly, that the external node establishes, according to the information about at least one node except the node A, the bidirectional neighbor relationship with one of nodes except the node A in the cluster system includes establishing, by the external node, the bidirectional neighbor relationship with any node if a ratio of a space area that is of at least one node and that is allocated in the cluster system to a space area that is of each bidirectional neighbor node of the at least one node and that is allocated in the cluster system meets the preset relations.

In this embodiment, a manner in which an external node establishes a bidirectional neighbor relationship with another node except the node A is the same as the manner described in step S41 to step S46, and details are not described again.

Figure 10:
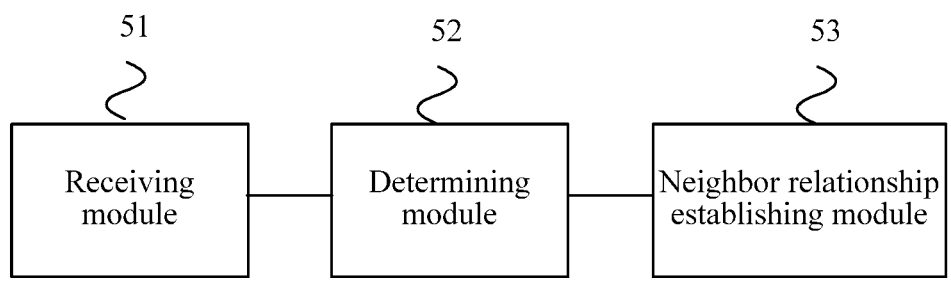
FIG. 10 is a schematic structural diagram of a cluster system self-organizing apparatus according to an embodiment of the present disclosure.

FIG. 10 is a schematic structural diagram of a cluster system self-organizing apparatus according to an embodiment of the present disclosure. The apparatus is deployed on all nodes in a cluster system. As shown in FIG. 10, the apparatus includes a receiving module 51, a determining module 52, and a neighbor relationship establishing module 53.

The receiving module 51 is configured to receive a request message sent by an external node for requesting to join the cluster system, where the cluster system includes at least two nodes, the node A is one node in the cluster system, the node A and at least one another node in the cluster system mutually have a bidirectional neighbor relationship, and two nodes that have the bidirectional neighbor relationship mutually transmit information.

The determining module 52 is configured to separately determine whether ratios of a space area that is of the node A and that is allocated in the cluster system to space areas that are of bidirectional neighbor nodes of the node A and that are allocated in the cluster system meet a preset relationship, where when the cluster system includes only one node, a two-dimensional coordinate system is established using the one node as an origin, in the two-dimensional coordinate, a cluster area is allocated to the cluster system, and the entire cluster area is allocated to the one node, and a space area that is occupied in the cluster area by the one node is reduced, and a space area in the cluster area is respectively allocated to the at least one joined external node when at least one external node joins the cluster system.

The neighbor relationship establishing module 53 is configured to establish the bidirectional neighbor relationship between the node A and the external node in order to ensure that nodes are evenly distributed in the cluster system and avoid centralized distribution of nodes in the cluster system when the preset relationship is met.

In the foregoing embodiment, the cluster system self-organizing apparatus further includes a first sending module (not shown) configured to send, to the external node, information about at least one node except the node A in the cluster system such that the external node joins the cluster system using the other node when a ratio of a space area that is of the node A and that is allocated in the cluster system to a space area that is of at least one bidirectional neighbor node of the node A and that is allocated in the cluster system does not meet the preset relationship.

In the foregoing embodiment, the first sending module is further configured to send, according to space areas that are of all nodes in the cluster system and that are allocated in the cluster system, information about the at least one node to the external node if a ratio of a space area that is of at least one node and that is allocated in the cluster system to a space area that is of each bidirectional neighbor node of the at least one node and that is allocated in the cluster system meets the preset relations.

In the foregoing embodiment, the receiving module 51 is further configured to obtain, using the bidirectional neighbor node of the node A, a message that the external node has joined the cluster system using another node except the node A in the cluster system.

In the foregoing embodiment, the cluster system self-organizing apparatus further includes a second sending module (not shown) configured to send, to the external node, information about a node that mutually has the bidirectional neighbor relationship with the node A, where the information is used by the external node to establish the bidirectional neighbor relationship with another node except the node A in the cluster system.

In the foregoing embodiment, the receiving module 51 is further configured to receive a notification message that the external node has established the bidirectional neighbor relationship with the other node except the node A in the cluster system.

In the foregoing embodiment, the receiving module 51 is further configured to receive a notification message that the external node has established the bidirectional neighbor relationship with the bidirectional neighbor node of the node A.

In the foregoing embodiment, the receiving module 51 is further configured to receive the notification message using another bidirectional neighbor node of the external node and/or the node A.

In the foregoing embodiment, the cluster system self-organizing apparatus further includes a third sending module (not shown) configured to send, to another bidirectional neighbor node of the node A except the external node, a message that the node A has established the bidirectional neighbor relationship with the external node such that the message that the external node has joined the cluster system is shared in the entire cluster system using the bidirectional neighbor node of the node A.

In the foregoing embodiment, the receiving module 51 is further configured to obtain, using the bidirectional neighbor node of the node A, a message that another new node has joined the cluster system.

Figure 11:
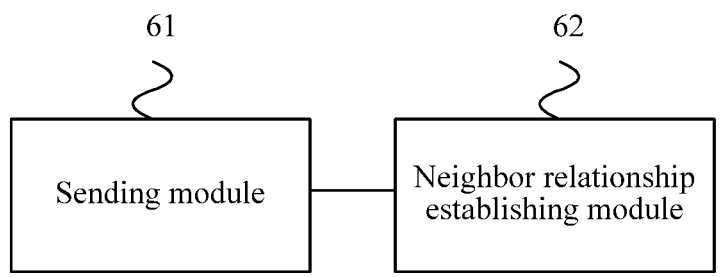
FIG. 11 is another schematic structural diagram of a cluster system self-organizing apparatus according to an embodiment of the present disclosure.

FIG. 11 is another schematic structural diagram of a cluster system self-organizing apparatus according to an embodiment of the present disclosure. The apparatus is deployed on an external node, and includes a sending module 61 and a neighbor relationship establishing module 62.

The sending module 61 is configured to send, to a node A in a cluster system, a request message for requesting to join the cluster system, where the cluster system includes at least two nodes, the node A is one node in the cluster system, the node A and at least one another node in the cluster system mutually have a bidirectional neighbor relationship, and two nodes that have the bidirectional neighbor relationship mutually transmit information.

The neighbor relationship establishing module 62 is configured to establish the bidirectional neighbor relationship between the external node and the node A when the node A allows the external node to join the cluster system.

In the foregoing embodiment, the cluster system self-organizing apparatus further includes a first receiving module (not shown) configured to receive information that is sent by the node A and that is about at least one node except the node A in the cluster system when the node A does not allow the external node to join the cluster system.

Correspondingly, the neighbor relationship establishing module 62 is further configured to establish, according to the information about at least one node except the node A, the bidirectional neighbor relationship between the external node and one of nodes except the node A in the cluster system.

In the foregoing embodiment, the first receiving module is further configured to receive information that is sent by the node A and that is about the at least one node if a ratio of a space area that is of at least one node and that is allocated in the cluster system to a space area that is of each bidirectional neighbor node of the at least one node and that is allocated in the cluster system meets the preset relations.

Correspondingly, the neighbor relationship establishing module 62 is further configured to establish the bidirectional neighbor relationship between the external node and any one of the at least one node if a ratio of a space area that is of at least one node and that is allocated in the cluster system to a space area that is of each bidirectional neighbor node of the at least one node and that is allocated in the cluster system meets the preset relations.

In the foregoing embodiment, the cluster system self-organizing apparatus further includes a second receiving module (not shown) configured to receive information that is sent by the node A and that is about a node that mutually has the bidirectional neighbor relationship with the node A when the node A allows the external node to join the cluster system.

Correspondingly, the neighbor relationship establishing module 62 is further configured to establish, according to the information about a node that mutually has the bidirectional neighbor relationship with the node A, the bidirectional neighbor relationship between the external node and a bidirectional neighbor node of the node A.

In the foregoing embodiment, the sending module 61 is further configured to send, to the node A, information that the external node has established the bidirectional neighbor relationship with the bidirectional neighbor node of the node A.

Figure 12:
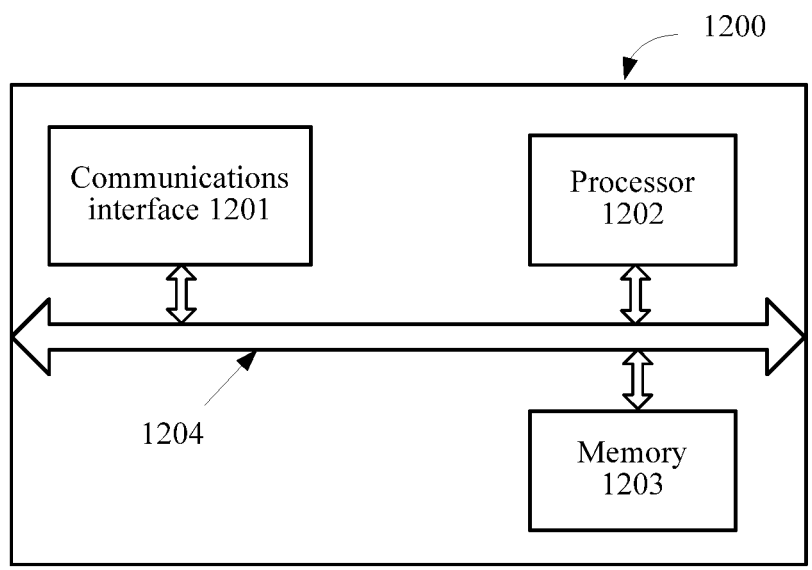
FIG. 12 is a schematic structural diagram of a node device according to an embodiment of the present disclosure.

FIG. 12 is a schematic structural diagram of a node device according to an embodiment of the present disclosure. The node device is configured to be deployed on a node in a cluster system. The node device 1200 includes a communications interface 1201, a memory 1203, and a processor 1202, where the communications interface 1201, the processor 1202, and the memory 1203 are mutually connected using a bus 1204. The bus 1204 may be a peripheral component interconnect (PCI) bus, an extended industry standard architecture (EISA) bus, or the like. The bus may be classified into an address bus, a data bus, a control bus, and the like. For convenience of denotation, the bus is represented using only one thick line in FIG. 12. However, it does not indicate that there is only one bus or only one type of bus.

The communications interface 1201 is configured to communicate with a transmit end. The memory 1203 is configured to store a program. Further, the program may include program code, where the program code includes a computer operation instruction. The memory 1203 may include a random access memory (RAM), or may include a non-volatile memory, for example, at least one magnetic disk storage.

The processor 1202 executes the program stored in the memory 1203 in order to implement the methods of the foregoing method embodiments of the present disclosure.

The communications interface 1201 is configured to receive a request message sent by an external node for requesting to join the cluster system, where the cluster system includes at least two nodes, a node that receives the request message is a node A, the node A is one node in the cluster system, the node A and at least one another node in the cluster system mutually have a bidirectional neighbor relationship, and two nodes that have the bidirectional neighbor relationship mutually transmit information.

The processor 1202 is configured to separately determine whether ratios of a space area that is of the node A and that is allocated in the cluster system to space areas that are of bidirectional neighbor nodes of the node A and that are allocated in the cluster system meet a preset relationship, where when the cluster system includes only one node, a two-dimensional coordinate system is established using the one node as an origin, in the two-dimensional coordinate, a cluster area is allocated to the cluster system, and the entire cluster area is allocated to the one node, and a space area that is occupied in the cluster area by the one node is reduced, and a space area in the cluster area is respectively allocated to the at least one joined external node when at least one external node joins the cluster system, and establish the bidirectional neighbor relationship between the node A and the external node in order to ensure that nodes are evenly distributed in the cluster system and avoid centralized distribution of nodes in the cluster system if the preset relationship is met.

The foregoing processor 1202 may be a general-purpose processor, including a central processing unit (CPU), a network processor (NP), and the like, or may be a digital signal processor (DSP), an application-specific integrated circuit (ASIC), a field programmable gate array (FPGA), or another programmable logic device, discrete gate or transistor logic device, or discrete hardware component.

Figure 13:
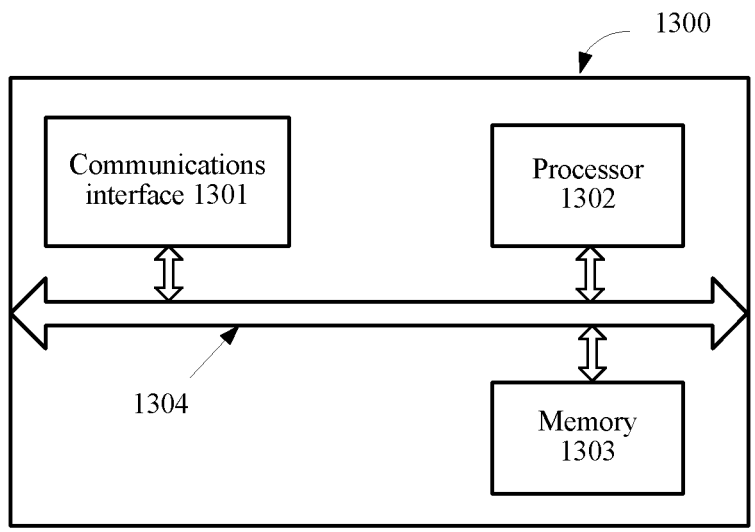
FIG. 13 is a schematic structural diagram of a node device according to an embodiment of the present disclosure.

FIG. 13 is a schematic structural diagram of a node device according to an embodiment of the present disclosure. The node device is configured to be deployed on a node outside a cluster system. The node device 1300 includes a communications interface 1301, a memory 1303, and a processor 1302, where the communications interface 1301, the processor 1302, and the memory 1303 are mutually connected using a bus 1304. The bus 1304 may be a PCI bus, an EISA bus, or the like. The bus may be classified into an address bus, a data bus, a control bus, and the like. For convenience of denotation, the bus is represented using only one thick line in FIG. 13. However, it does not indicate that there is only one bus or only one type of bus.

The communications interface 1301 is configured to communicate with a transmit end. The memory 1303 is configured to store a program. Further, the program may include program code, where the program code includes a computer operation instruction. The memory 1303 may include a RAM, or may further include a non-volatile memory, for example, at least one magnetic disk storage.

The processor 1302 executes the program stored in the memory 1303 in order to implement the methods of the foregoing method embodiments of the present disclosure.

The communications interface 1301 is configured to send, to a node A in the cluster system, a request message for requesting to join the cluster system, where the cluster system includes at least two nodes, the node A is one node in the cluster system, the node A and at least one another node in the cluster system mutually have a bidirectional neighbor relationship, and two nodes that have the bidirectional neighbor relationship mutually transmit information, and establish the bidirectional neighbor relationship with the node A when the node A allows an external node to join the cluster system.

The foregoing processor 1302 may be a general-purpose processor, including a CPU, an NP, and the like, or may be a DSP, an ASIC, an FPGA, or another programmable logic device, discrete gate or transistor logic device, or discrete hardware component.

Figure 14:
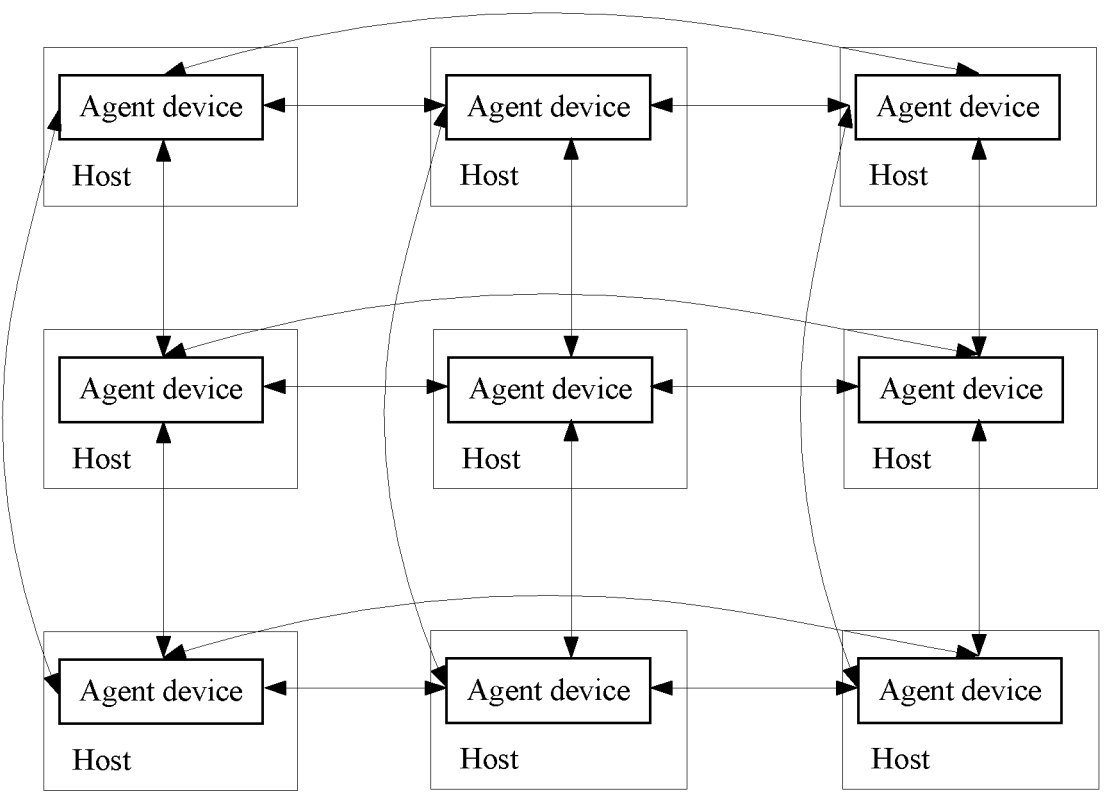
FIG. 14 is a schematic structural diagram of a cluster system.

FIG. 14 is a schematic structural diagram of a cluster system. As shown in FIG. 14, the cluster system includes at least two hosts, and the node device shown in FIG. 12 is deployed on each host as an agent device.

The host in the cluster system establishes, using the agent device, a bidirectional neighbor relationship with at least one another host except the host, and two hosts that have the bidirectional neighbor relationship mutually transmit information using the agent device.

Any host in the cluster system further receives, using the agent device, a request message sent by an external host for requesting to join the cluster system. The node device shown in FIG. 13 is deployed on the external host.

The host that receives the request message separately determines, using an agent device of the host, whether ratios of a space area that is of the host and that is allocated in the cluster system to space areas that are of bidirectional neighbor nodes of the host and that are allocated in the cluster system meet a preset relationship, where when the cluster system includes only one node, a two-dimensional coordinate system is established using the one node as an origin, in the two-dimensional coordinate, a cluster area is allocated to the cluster system, and an entire cluster area is allocated to the one node, and a space area that is occupied in the cluster area by the one node is reduced, and a space area in the cluster area is respectively allocated to the at least one joined external node when at least one external node joins the cluster system, and establishes, using the agent device, the bidirectional neighbor relationship with the external host in order to ensure that nodes are evenly distributed in the cluster system and avoid centralized distribution of nodes in the cluster system if the preset relationship is met.

Figure 15:
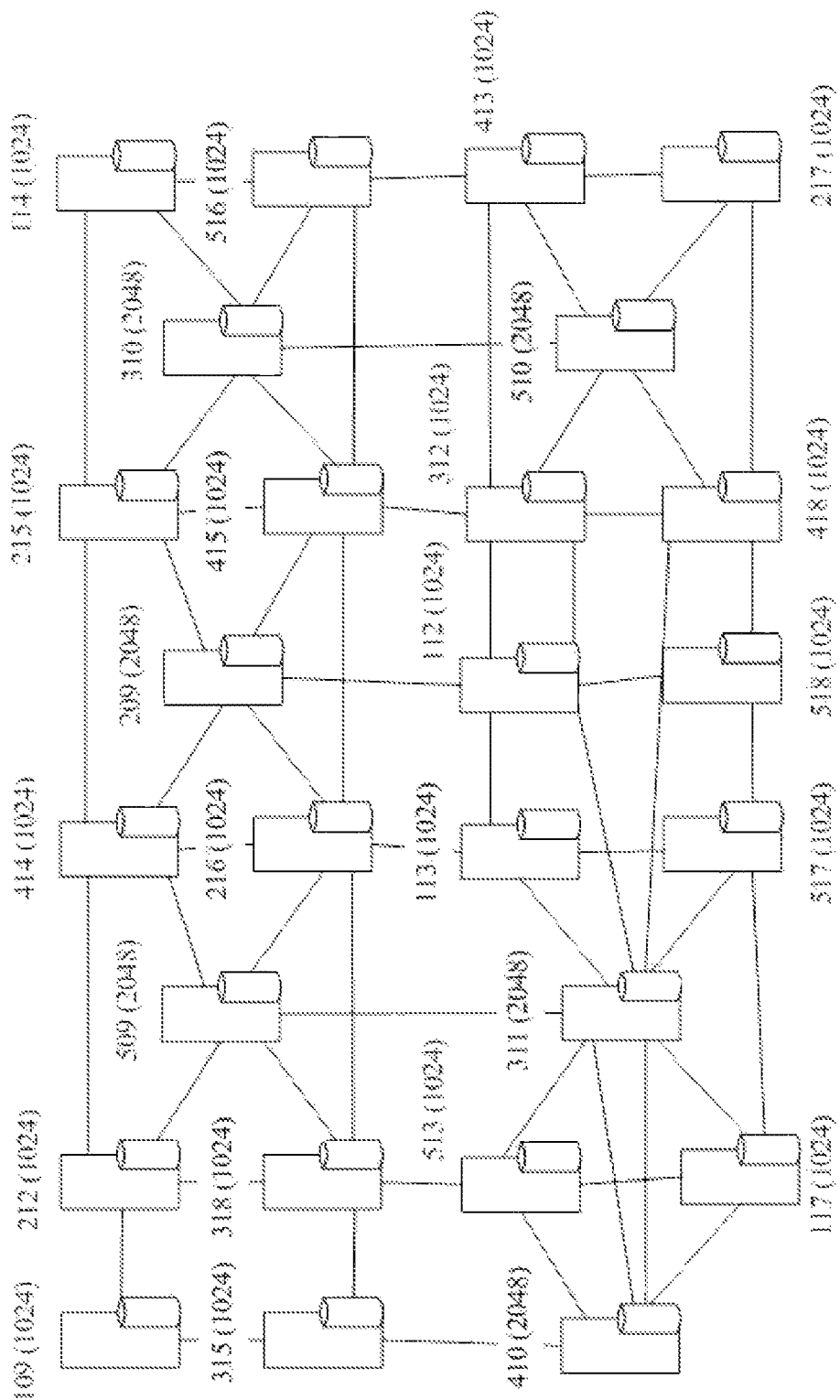
FIG. 15 is another schematic structural diagram of a cluster system according to an embodiment of the present disclosure.

FIG. 15 is another schematic structural diagram of a cluster system according to an embodiment of the present disclosure. As shown in FIG. 15, the cluster system includes multiple node devices, where any node device establishes a bidirectional neighbor relationship with another node device in the cluster system. After each node joins a cluster, the cluster system allocates a node number to a node and allocates a space area that is allocated in the cluster system, to a newly joined node. As shown in FIG. 15, a node 318 (1024) indicates that a node number is 318 and a space area allocated by the cluster system to the node 318 is 1024. After the node 318 receives a request message sent by an external node for requesting to join the cluster system, the node 318 determines whether ratios of a space area that is of the node 318 and that is allocated in the cluster system to space areas that are of bidirectional neighbor nodes of the node 318 and that are allocated in the cluster system meet a preset relationship, that is, the node 318 determines whether ratios of a space area allocated to the node 318 to space areas that are allocated to neighbor nodes 212, 315, 509, 216, and 513 meet the preset relationship, for example, whether a relationship of 1:1 or 2:1 is met. Because a ratio of a space area of the node 318 (1024) to a space area of the node 509 (2048) does not meet a specified proportional relationship, the node 318 does not allow the external node to join the cluster system. In this case, the node 318 may send information about the node 509 to the external node such that the external node sends a request-to-join message to the node 509. After receiving the request message sent by the external node for requesting to join the cluster system, the node 509 determines that a ratio of the space area allocated to the node 509 to a space area allocated to a bidirectional neighbor node meets the preset proportional relationship. Therefore, the node 509 establishes the bidirectional neighbor relationship with the external node. After the external node joins the cluster system, the node 509 allocates half of the space area of the node 509 to a newly joined external node, and the newly joined external node also stores a number of the external node and an area allocated by the node 509. Further, as shown in the FIG. 15, each of the nodes 109, 112, 113, 114, 117, 215, 217, 312, 413, 414, 415, 418, 516, 517, and 518 includes a space area of 1024 while each of the nodes 209, 310, 311, 410, and 510 includes a space area of 2048.

In this embodiment of the present disclosure, virtual space areas are allocated to all nodes in a cluster system. A distribution status of all nodes in the cluster system is reflected according to the virtual space areas, and whether an external node joins the cluster system is determined according to a space area allocated to a node in order to ensure that nodes are evenly distributed in the cluster system and avoid centralized distribution of nodes in the cluster system.

Further, all nodes in the cluster system shown in FIG. 15 establish bidirectional neighbor relationships with neighbor nodes of the all nodes. Each node maintains and detects running status of neighbor nodes of each node. When one of nodes is faulty, neighbor nodes of the faulty node synchronize a fault detection result, and simultaneously take over neighbor relationships of the faulty node in order to implement fast detection of the faulty node in the cluster system.

The cluster system of this embodiment may be further applied to a cloud computing server cluster system. Further, at least two servers are deployed in the cloud computing server cluster system. Any server in the cluster system establishes a neighbor relationship with another server in the cluster system in order to implement data transmission in the cluster system.

In an existing method, any server in the cloud computing server cluster system selects at least one another server in the cluster system to establish a unidirectional neighbor relationship. That is, after the server selects the at least one another server in the cluster system as a neighbor of the server, the server may send information to a neighbor server of the server, but the neighbor server of the server does not send information about the neighbor server to the server. In addition, the server may change a neighbor at different moments. It can be learned that, in an existing cloud computing server cluster system, a unidirectional neighbor relationship is established between nodes, and transmission of information about a server is unidirectional, which is inconducive to spreading of server information in the cluster system. In addition, a server may select different neighbors at different moments. Therefore, a topology structure of the cluster system is unstable, which is inconducive to maintaining high availability of the cloud computing server cluster system.

To maintain high availability of the cloud computing server cluster system, in the method, a server deployed in the cloud computing server cluster system establishes a bidirectional neighbor relationship with a neighbor server of the server. After a server, for example, a server A, selects at least one server in the cluster as a neighbor server, the server A establishes the bidirectional neighbor relationship with a neighbor of the server A. That is, the server A and a bidirectional neighbor server of the server A may mutually transmit information. In addition, at different moments, the bidirectional neighbor relationship between servers remains unchanged.

Further, when an external server outside the cloud computing server cluster system sends a request-to-join message to one of servers in the cluster, a server that receives the message determines, according to whether a ratio of a space area pre-stored by the server to a space area of a bidirectional neighbor server of the server meets a preset relationship, whether to allow the external server to join the cluster system. The server allows the external server to join the cluster system if the preset relationship is met, or the server sends information about another server in the cluster system to the external server such that the external server joins the cloud computing server cluster system using the other server if the preset relationship is not met. Concepts of all servers in the cloud computing server cluster system correspond to concepts of nodes in the foregoing. A method for allocating space areas to all servers in the cloud computing server cluster system is the same as the manner in FIG. 7, and details are not described again.

It can be learned that, in the present disclosure, servers in a cloud computing server cluster system maintain a fixed bidirectional neighbor relationship. A new external server establishes a bidirectional neighbor relationship with any server in the cluster system when the new external server joins the cluster system, which changes only a local neighbor relationship of the cluster system without affecting an entire topology structure of the cluster system in order to maintain stability of the topology structure of the cluster system. In addition, the bidirectional neighbor relationship between servers facilitates fast spreading of server information in the entire cluster system. Especially when a server in the cluster is faulty, the bidirectional neighbor relationship between servers facilitates fast diagnosis and detection of the faulty server. Therefore, a cluster system established using the method can maintain relatively high availability.

Persons of ordinary skill in the art may understand that all or some of the steps of the method embodiments may be implemented by a program instructing relevant hardware. The program may be stored in a computer-readable storage medium. The steps of the method embodiments are performed when the program runs. The foregoing storage medium includes any medium that can store program code, such as a ROM, a RAM, a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A cluster system self-organizing method, comprising:
receiving, by a node A in a cluster system, a request message from an external node for requesting to join the cluster system, wherein the node A is one node in the cluster system, wherein the node A and at least one other node in the cluster system mutually comprises a bidirectional neighbor relationship, and wherein two nodes that comprise the bidirectional neighbor relationship mutually transmit information;
separately determining, by the node A, whether a ratio of a space area of the node A and allocated in the cluster system to a space area of each bidirectional neighbor node of the node A and allocated in the cluster system is a preset value, wherein when the cluster system comprises only one node, a two-dimensional coordinate system is established using the one node as an origin, wherein a cluster area is allocated to the cluster system and the entire cluster area is allocated to the one node in the two-dimensional coordinate system, and wherein when the external node joins the cluster system, a space area occupied in the cluster area by the one node is reduced- and another space area in the cluster area is respectively allocated to the at least one joined external node; and
establishing, by the node A, the bidirectional neighbor relationship with the external node in order to ensure that nodes in the cluster system are evenly distributed in the cluster system and avoid centralized distribution of nodes in the cluster system when the ratio is the preset value.

2. The method according to claim 1, further comprising sending, by the node A to the external node, information about at least one node except the node A in the cluster system such that the external node joins the cluster system using the other node when the ratio of the space area of the node A and allocated in the cluster system to the space area of at least one bidirectional neighbor node of the node A and allocated in the cluster system does not meet the preset value.

3. The method according to claim 2, wherein sending, the information about the at least one node except the node A in the cluster system comprises sending, by the node A according to space areas that are of all nodes in the cluster system and that are allocated in the cluster system, the information about the at least one node to the external node when a ratio of a space area of the at least one node and allocated in the cluster system to a space area of each bidirectional neighbor node of the at least one node and allocated in the cluster system that meets preset relationships.

4. The method according to claim 3, further comprising obtaining, by the node A using a bidirectional neighbor node of the node A, a message that the external node has joined the cluster system using another node except the node A in the cluster system.

5. The method according to claim 1, further comprising sending, by the node A to the external node, information about a node that mutually comprises the bidirectional neighbor relationship with the node A, wherein the information is used by the external node to establish the bidirectional neighbor relationship with the node except the node A in the cluster system.

6. The method according to claim 5, further comprising receiving, by the node A, a notification message that the external node has established the bidirectional neighbor relationship with the node except the node A in the cluster system.

7. The method according to claim 6, wherein receiving the notification message that the external node has established the bidirectional neighbor relationship with the node except the node A in the cluster system comprises receiving, by the node A, the notification message that the external node has established the bidirectional neighbor relationship with a bidirectional neighbor node of the node A.

8. The method according to claim 6, wherein receiving the notification message that the external node has established the bidirectional neighbor relationship with the node except the node A in the cluster system comprises receiving, by the node A, the notification message using another bidirectional neighbor node of the external node and the node A.

9. The method according to claim 6, wherein receiving the notification message that the external node has established the bidirectional neighbor relationship with the node except the node A in the cluster system comprises receiving, by the node A, the notification message using another bidirectional neighbor node of the external node.

10. The method according to claim 6, wherein receiving the notification message that the external node has established the bidirectional neighbor relationship with the node except the node A in the cluster system comprises receiving, by the node A, the notification message using another bidirectional neighbor node of the node A.

11. The method according to claim 1, wherein after establishing the bidirectional neighbor relationship with the external node, the method further comprises sending, by the node A to another bidirectional neighbor node of the node A except the external node, a message that the node A has established the bidirectional neighbor relationship with the external node such that the message that the external node has joined the cluster system is shared in the entire cluster area using a bidirectional neighbor node of the node A.

12. The method according to claim 1, further comprising obtaining, by the node A using a bidirectional neighbor node of the node A, a message that another new node has joined the cluster system.

13. A node device configured to be deployed on a node in a cluster system, comprising:
- a communications interface;
- a memory configured to store a program;
- a processor configured to execute the program stored in the memory; and
- a communications bus, wherein the communications interface, the memory, and the processor communicate using the communications bus,
- wherein the communications interface is configured to receive a request message from an external node for requesting to join the cluster system, wherein a node that receives the request message is a node A, wherein the node A is one node in the cluster system, wherein the node A and at least one other node in the cluster system mutually comprises a bidirectional neighbor relationship, and wherein two nodes that comprise the bidirectional neighbor relationship mutually transmit information, and
- wherein the processor being is configured to:
  - separately determine whether a ratio of a space area of the node A and allocated in the cluster system to a space area of each bidirectional neighbor node of the node A and allocated in the cluster system is a preset value, wherein when the cluster system comprises only one node, a two-dimensional coordinate system is established using the one node as an origin, wherein a cluster area is allocated to the cluster system; and the entire cluster area is allocated to the one node in the two-dimensional coordinate system, and wherein when the external node joins the cluster system, a space area occupied in the cluster area by the one node is reduced and another space area in the cluster area is respectively allocated to the at least one joined external node; and
  - establish the bidirectional neighbor relationship between the node A and the external node in order to ensure that nodes in the cluster system are evenly distributed in the cluster system and avoid centralized distribution of nodes in the cluster system when the ratio is the preset value.

14. A node device configured to be deployed on a node outside a cluster system, comprising:
- a communications interface;
- a memory configured to store a program;
- a processor configured to execute the program stored in the memory; and
- a communications bus, wherein the communications interface, the memory, and the processor communicate using the communications bus, wherein the communications interface is configured to send, to a node A in the cluster system, a request message for requesting to join the cluster system, wherein the cluster system comprising at least two nodes, wherein the node A is one node in the cluster system, wherein the node A and at least one other node in the cluster system mutually has a bidirectional neighbor relationship, and wherein the two nodes that have the bidirectional neighbor relationship mutually transmit information, and
- wherein the processor is further configured to establish the bidirectional neighbor relationship with the node A when the node A allows the external node to join the cluster system based on a ratio of a space area of the node A and allocated in the cluster system to a space area of each bidirectional neighbor node of the node A and allocated in the cluster system is a preset value.

15. A cluster system, comprising:
- a newly added node B; and
- a node A being one node of at least two nodes in the cluster system, and
- wherein a process of the newly added node B joining the cluster system comprises:
  - receiving, by the node A, a request message from the node B for requesting to join the cluster system, wherein the node A and at least one other node in the cluster system mutually having a bidirectional neighbor relationship, and wherein the two nodes that have the bidirectional neighbor relationship mutually transmitting information;
  - separately determining, by the node A, whether a ratio of a space area of the node A and allocated in the cluster system to a space area of each bidirectional neighbor node of the node A and allocated in the cluster system is a preset value, wherein when the cluster system comprises only one node, a two-dimensional coordinate system is established using the one node as an origin, wherein a cluster area is allocated to the cluster system; and the entire cluster area is allocated to the one node in the two-dimensional coordinate system, and wherein when at least one external node joins the cluster system, a space area occupied in the cluster area by the one node is reduced; and another space area in the cluster area is respectively allocated to the at least one joined external node; and
  - establishing, by the node A, the bidirectional neighbor relationship with the node B in order to ensure that nodes in the cluster system are evenly distributed in the cluster system and avoid centralized distribution of nodes in the cluster system when the ratio is the preset value.

16. The node device of claim 13, wherein the processor is further configured to send information about at least one node except the node A in the cluster system such that the external node joins the cluster system using the other node when the ratio of the space area of the node A and allocated in the cluster system to the space area of at least one bidirectional neighbor node of the node A and allocated in the cluster system does not meet the preset value.

17. The node device of claim 13, wherein the processor is further configured to send information about a node that mutually comprises the bidirectional neighbor relationship with the node A.

18. The node device of claim 14, wherein the processor is further configured establish the bidirectional neighbor relationship the other node when the ratio of the space area of the node A and allocated in the cluster system to the space area of at least one bidirectional neighbor node of the node A and allocated in the cluster system does not meet the preset value.

19. The cluster system of claim 15, wherein the process further comprises sending information about at least one node except the node A in the cluster system such that the external node joins the cluster system using the other node when the ratio of the space area of the node A and allocated in the cluster system to the space area of at least one bidirectional neighbor node of the node A and allocated in the cluster system does not meet the preset value.

20. The cluster system of claim 15, wherein the process further comprises sending send information about a node that mutually comprises the bidirectional neighbor relationship with the node A.

* * * * *

UNITED STATES PATENT AND TRADEMARK OFFICE
CERTIFICATE OF CORRECTION

PATENT NO. : 10,904,093 B2
APPLICATION NO. : 15/392136
DATED : January 26, 2021
INVENTOR(S) : Lin Hu, Xianping Wu and Peixing Peng Page 1 of 1

It is certified that error appears in the above-identified patent and that said Letters Patent is hereby corrected as shown below:

In the Claims

Claim 1, Column 23, Line 53: "node is reduced- and another" should read "node is reduced and another"

Claim 13, Column 25, Line 33: "system; and the entire" should read "system and the entire"

Claim 15, Column 26, Line 26: "system; and the entire" should read "system and the entire"

Claim 15, Column 26, Line 31: "reduced; and another" should read "reduced and another"

Signed and Sealed this
Twenty-third Day of March, 2021

Drew Hirshfeld
*Performing the Functions and Duties of the*
*Under Secretary of Commerce for Intellectual Property and*
*Director of the United States Patent and Trademark Office*